(12) United States Patent
Hooli et al.

(10) Patent No.: US 12,587,422 B2
(45) Date of Patent: Mar. 24, 2026

(54) REFERENCE SIGNAL MANAGEMENT

(71) Applicant: Nokia Technologies Oy, Espoo (FI)

(72) Inventors: Kari Juhani Hooli, Oulu (FI); Esa Tapani Tiirola, Oulu (FI); Mieszko Chmiel, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 342 days.

(21) Appl. No.: 18/516,171

(22) Filed: Nov. 21, 2023

(65) Prior Publication Data

US 2024/0179039 A1 May 30, 2024

(30) Foreign Application Priority Data

Nov. 30, 2022 (FI) ...................................... 20226067

(51) Int. Cl.
*H04L 27/26* (2006.01)
*H04L 5/00* (2006.01)
(52) U.S. Cl.
CPC ........ *H04L 27/2613* (2013.01); *H04L 5/0048* (2013.01); *H04L 27/2607* (2013.01)
(58) Field of Classification Search
CPC .......... H04L 25/03834; H04L 27/2607; H04L 27/2613; H04L 27/26132; H04L 27/26134; H04L 27/2636; H04L 27/26412; H04L 5/0048
See application file for complete search history.

(56) References Cited

U.S. PATENT DOCUMENTS

| | | | |
|---|---|---|---|
| 10,219,232 B2 * | 2/2019 | Yu ........................ H04B 7/0617 |
| 11,632,280 B2 | 4/2023 | Pajukoski et al. |
| 2012/0314743 A1 * | 12/2012 | Yoon ................... H04L 27/2613 |
| | | | 375/295 |

(Continued)

FOREIGN PATENT DOCUMENTS

| | | |
|---|---|---|
| EP | 4027601 A | 7/2022 |
| WO | 2021/233550 A1 | 11/2021 |
| WO | 2024/061872 A1 | 3/2024 |

OTHER PUBLICATIONS

"DFT-Spread OFDM with Pulse Shaping Filter in Frequency Domain in Evolved UTRA Uplink", 3GPP TSG RAN WG1 #42 on LTE, R1-050702, Agenda Item: 10.3, NTT DoCoMo, Aug. 29-Sep. 2, 2005, pp. 1-8.

(Continued)

*Primary Examiner* — Kashif Siddiqui
(74) *Attorney, Agent, or Firm* — Lippes Mathias LLP

(57) ABSTRACT
According to an example aspect of the present invention, there is provided an apparatus configured to select a reference signal sequence, determine a number of resource blocks located outside a frequency interval via spectrally extending the signal, and when the number is an odd number, perform exactly one of the following: symmetrically extend a cyclically shifted version of the selected reference signal sequence, or asymmetrically extend the selected reference signal sequence without shifting it, map the extended reference signal sequence to resource blocks located in the frequency interval and resource blocks located outside the frequency interval, perform spectral shaping of a second signal comprising the resource blocks located both inside and outside the frequency interval, and transmit the second signal in uplink direction.

20 Claims, 6 Drawing Sheets

(56)                    References Cited

U.S. PATENT DOCUMENTS

2017/0105112 A1*    4/2017   Park ..................... H04L 5/0035
2023/0188396 A1*    6/2023   Pajukoski ............. H04L 5/0051
                                                                        370/329

OTHER PUBLICATIONS

"On spectrum shaping for uplink Pi/2 BPSK with DFT-s-OFDM", 3GPP TSG-RAN WG1#89, R1-1709002, Agenda item: 7.1.5, Nokia, May 15-19, 2017, 3 pages.

"Further Link Results for p/2 Bpsk DFT-s-OFDM Waveform with Spectrum Shaping and MMSE Receiver", 3GPP TSG RAN WG4 Meeting #85, R4-1714191, Agenda Item: 9.4.3.2, IITH, Nov. 27-Dec. 1, 2017, 5 pages.

"Performance evaluation for pi/2 BPSK with FDSS", 3GPP TSG RAN WG1 Meeting #88bis, R1-1705060, Agenda Item: 8.1.10, Huawei, Apr. 3-7, 2017, 8 pages.

"On the detection performance of pi/2-BPSK DFT-s-OFDM with transparent shaping", 3GPP TSG-RAN WG4 Meeting #84bis, R4-1710213, Agenda Item: 9.4.3.10, Huawei, Oct. 9-13, 2017, 4 pages.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.6.0, Jun. 2022, 720 pages.

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.6.0, Jun. 2022, pp. 1-219.

"New WID on NR UL Enhancements", 3GPP TSG RAN Meeting #94e, RP-212702, Agenda Item: 8A. 1, NTT DoCoMo, Inc., Dec. 6-17, 2021, 5 pages.

"New WI: Further NR coverage enhancements", 3GPP TSG RAN Meeting #94e, RP-213579, Agenda Item: 8.6.1, China Telecom, Dec. 6-17, 2021, 5 pages.

Office Action received for corresponding Finnish Patent Application No. 20226067, dated Apr. 26, 2023, 9 pages.

"Discussion on coverage enhancement in power domain", 3GPP TSG-RAN WG1 Meeting #111, R1-2210880, Agenda Item: 9.14.2, Huawei, Nov. 14-18, 2022, 28 pages.

"Final FL summary of power domain enhancements (AI 9.14.2)", 3GPP TSG RAN WG1 #110bis-e, R1-2210326, Agenda item: 9.14.2, Nokia, Oct. 10-19, 2022, 94 pages.

"FL summary on DMRS#3", 3GPP TSG RAN WG1 #113, R1-2306130, Agenda item: 9.1.3.1, NTT DoCoMo, May 22-26, 2023, pp. 1-119.

"Uplink coverage enhancements", 3GPP TSG RAN Meeting #100, RP-230864, Agenda item: 9.3.1.3, Nokia, Jun. 12-14, 2023, 7 pages.

Bisoyi et al., "Meeting IMT 2030 Performance Targets: The Potential of OTFDM Waveform and Structural MIMO Technologies", arXiv, Jul. 26, 2023, 26 pages.

Extended European Search Report received for corresponding European Patent Application No. 23195878.6, dated Mar. 5, 2024, 8 pages.

Nasarre et al., Enhanced Uplink Coverage for 5G NR: Frequency-Domain Spectral Shaping With Spectral Extension, IEEE Open Journal of the Communications Society, vol. 2, May 21, 2021, pp. 1188-1204.

* cited by examiner

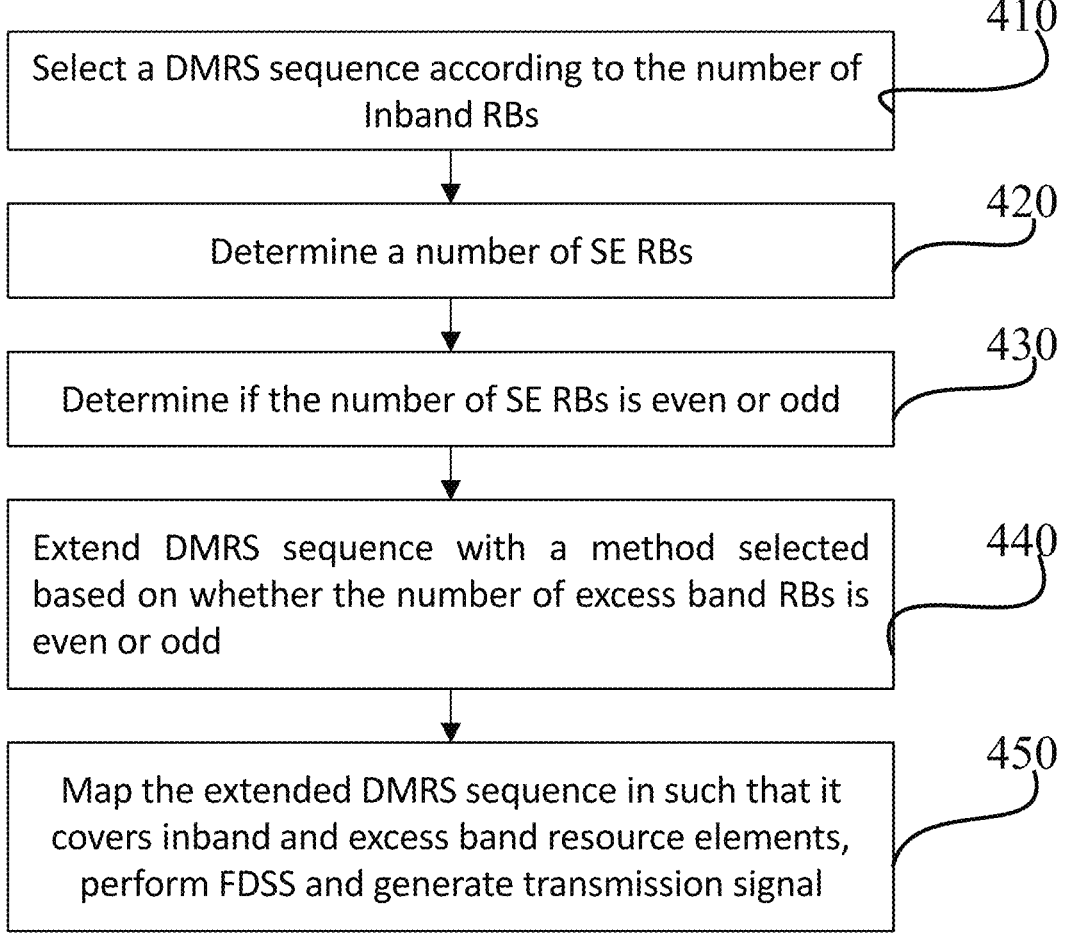

410

Select a DMRS sequence according to the number of Inband RBs

420

Determine a number of SE RBs

430

Determine if the number of SE RBs is even or odd

440

Extend DMRS sequence with a method selected based on whether the number of excess band RBs is even or odd

450

Map the extended DMRS sequence in such that it covers inband and excess band resource elements, perform FDSS and generate transmission signal

FIG. 4

REFERENCE SIGNAL MANAGEMENT

FIELD

The present disclosure relates to generating reference signal sequences for use in wireless communication.

BACKGROUND

Frequency domain spectral shaping, FDSS, is a technique used to modify frequency-domain characteristics of signals transmitted over a wireless communication channel, without changing the information content encoded in the signal. For example, spectral shaping may be used to obtain a more favourable, lower, peak-to-average power ratio, PAPR, in a signal to be transmitted, which facilitates its transmission at a higher power since lower PAPR is more compatible with characteristics of power amplifiers, PAs, used in transmitters. A cubic metric, CM, is a metric for an actual reduction in power capability, or power de-rating, of a PA in an uplink transmitter. Further, or alternatively, spectral shaping may be employed to reduce the effects of adjacent-channel interference, for example, such that signals occupying neighbouring frequency bands are able to coexist more independently of each other.

Spectral extension, on the other hand, is a technique used, for example in the frequency domain, to widen a frequency extent used by a transmission, such as an uplink transmission, such that it extends partly outside a nominal frequency band assigned to the transmission. Using spectrum extension, some energy may be transmitted, carrying information content encoded in the signal, outside the normal frequency band assigned to the transmission. The spectrally extended transmission thus comprises both in-band and out-of-band (also known as excess band) energy in the form of modulated electromagnetic waves.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core and at least one memory storing instructions that, when executed by the at least one processing core, cause the apparatus at least to select a reference signal sequence for a first signal based on a first number of resource blocks located inside a frequency interval, determine a second number of resource blocks located outside the frequency interval via spectrally extending the first signal, determine whether the second number is an odd number, and based on determining that the second number is an odd number, apply a frequency shift to the first signal and extend the selected reference signal sequence by performing exactly one of the following: applying a cyclic shift to the selected reference signal sequence and then applying a cyclic extension to the selected reference signal sequence at both ends of the selected reference signal sequence, or applying a cyclic extension to the selected reference signal sequence, wherein the cyclic extension is by a third number of sequence elements at a first end of the selected reference signal sequence and by a fourth number of sequence elements at a second end of the selected reference signal sequence, wherein the third number of sequence elements is greater than the fourth number of sequence elements, and map the extended reference signal sequence to the resource blocks located in the frequency interval and the resource blocks located outside the frequency interval, perform spectral shaping of a second signal comprising the resource blocks located both inside and outside the frequency interval, and transmit the second signal in uplink direction.

According to a second aspect of the present disclosure, there is provided a method in an apparatus, comprising selecting a reference signal sequence for a first signal based on a first number of resource blocks located in a frequency interval, determining a second number of resource blocks located outside the frequency interval via spectrally extending the first signal, determining whether the second number is an odd number, and based on determining that the second number is an odd number, apply a frequency shift to the first signal and extend the selected reference signal sequence by performing exactly one of the following: applying a cyclic shift to the selected reference signal sequence and then applying a cyclic extension to the selected reference signal sequence at both ends of the selected reference signal sequence, or applying a cyclic extension to the selected reference signal sequence, wherein the cyclic extension is by a third number of sequence elements at a first end of the sequence and by a fourth number of sequence elements at a second end of the sequence, wherein the third number of sequence elements is greater than the fourth number of sequence elements, and mapping the extended reference signal sequence to the resource blocks located in the frequency interval and the resource blocks located outside the frequency interval, performing spectral shaping of a second signal comprising the resource blocks located both inside and outside the frequency interval, and transmitting the second signal in uplink direction.

According to a third aspect of the present disclosure, there is provided an apparatus comprising at least one processing core and at least one memory storing instructions that, when executed by the at least one processing core, cause the apparatus at least to select a reference signal sequence based on a first number of resource blocks located inside a frequency interval in an uplink transmission received by the apparatus, determine a second number of resource blocks located outside the frequency interval via spectrally extending the uplink transmission, determine whether the second number is an odd number, and based on determining that the second number is an odd number, apply a frequency shift to the uplink transmission received by the apparatus and extend the selected reference signal sequence by performing exactly one of the following: applying a cyclic shift to the selected reference signal sequence and then applying a cyclic extension to the selected reference signal sequence at both ends of the selected reference signal sequence, or applying a cyclic extension to the selected reference signal sequence, wherein the cyclic extension is by a third number of sequence elements at a first end of the sequence and by a fourth number of sequence elements at a second end of the sequence, wherein the third number of sequence elements is greater than the fourth number of sequence elements, and employ the extended reference signal sequence in reception of the uplink transmission in the apparatus.

According to a fourth aspect of the present disclosure, there is provided a method in an apparatus, comprising selecting a reference signal sequence based on a first number of resource blocks located inside a frequency interval in an uplink transmission received by the apparatus, determining a second number of resource blocks located outside the frequency interval via spectrally extending the uplink transmission, determine whether the second number is an odd number, and based on determining that the second number is an odd number, apply a frequency shift to the uplink transmission received by the apparatus signal and extend the selected reference signal sequence by performing exactly one of the following: applying a cyclic shift to the selected reference signal sequence and then applying a cyclic extension to the selected reference signal sequence at both ends of the selected reference signal sequence, or applying a cyclic extension to the selected reference signal sequence, wherein the cyclic extension is by a third number of sequence elements at a first end of the sequence and by a fourth number of sequence elements at a second end of the sequence, wherein the third number of sequence elements is greater than the fourth number of sequence elements, and employing the extended reference signal sequence in reception of the uplink transmission in the apparatus.

According to a fifth aspect of the present disclosure, there is provided a non-transitory computer readable medium having stored thereon a set of computer readable instructions that, when executed by at least one processor, cause an apparatus to at least select a reference signal sequence for a first signal based on a first number of resource blocks located in a frequency interval, determine a second number of resource blocks located outside the frequency interval via spectrally extending the first signal, determine whether the second number is an odd number, and based on determining that the second number is an odd number, apply a frequency shift to the first signal and extend the selected reference signal sequence by performing exactly one of the following: applying a cyclic shift to the selected reference signal sequence and then applying a cyclic extension to the selected reference signal sequence at both ends of the selected reference signal sequence, or applying a cyclic extension to the selected reference signal sequence, wherein the cyclic extension is by a third number of sequence elements at a first end of the sequence and by a fourth number of sequence elements at a second end of the sequence, wherein the third number of sequence elements is greater than the fourth number of sequence elements, and map the extended reference signal sequence to the resource blocks located in the frequency interval and the resource blocks located outside the frequency interval, performing spectral shaping of a second signal comprising the resource blocks located both inside and outside the frequency interval, and transmit the second signal in uplink direction.

BRIEF DESCRIPTION OF THE DRAWINGS

FIG. 4 illustrates an example process in accordance with at least some embodiments of the present invention.

EMBODIMENTS

The present document discloses methods to facilitate spectral shaping of spectrally extended transmission, such that orthogonality of used reference signal sequences is maintained in uplink transmission. In detail, a reference signal sequence is either shifted and then symmetrically extended, or, alternatively, asymmetrically extended without shifting.

Figure 1:
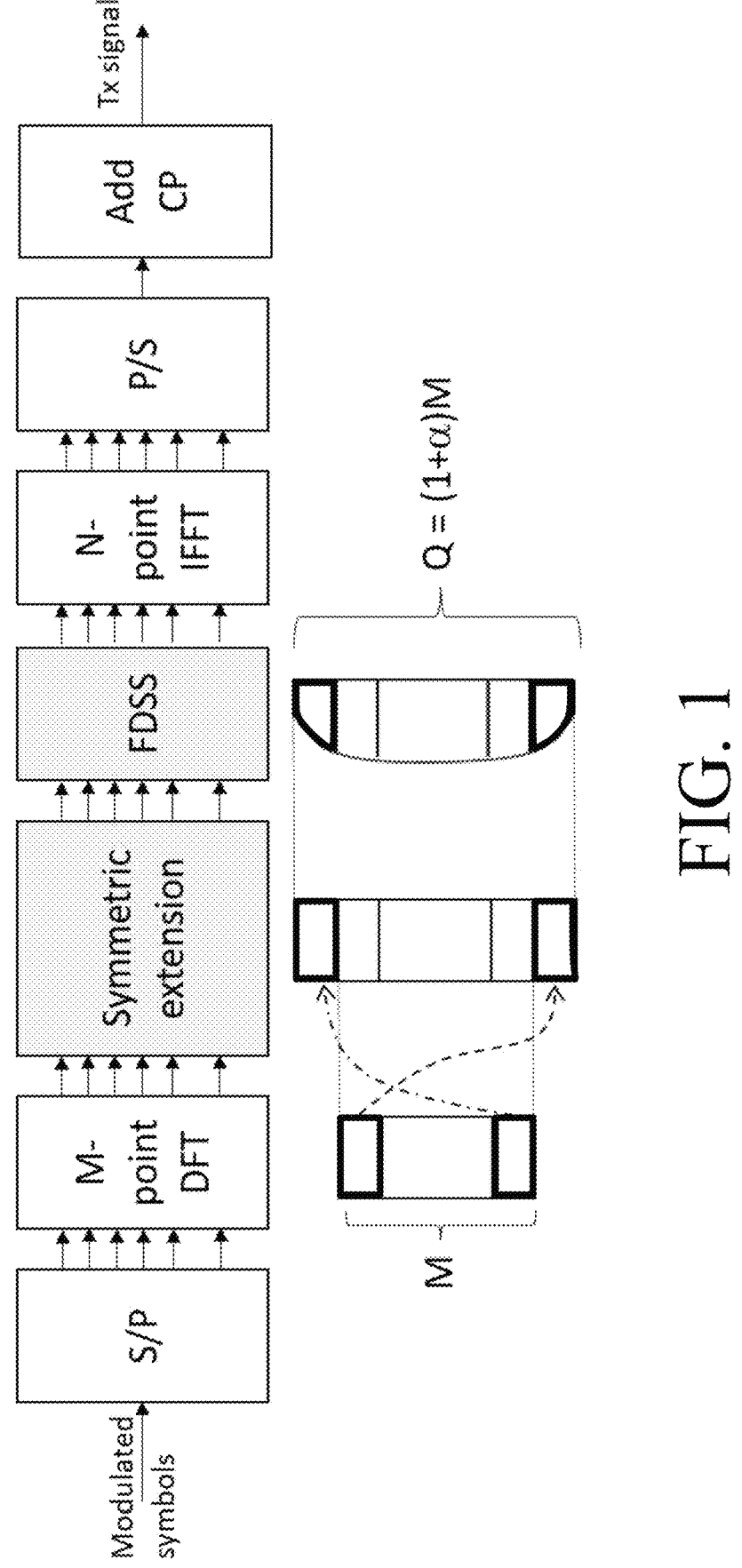
FIG. 1 illustrates an example transmitter sequence in accordance with at least some embodiments of the present invention.

FIG. 1 illustrates an example transmitter sequence in accordance with at least some embodiments of the present invention. FIG. 1 is an example implementation of spectral shaping with spectrum extension, to which the principles disclosed herein are not limited. Other implementations of frequency domain spectral shaping with spectral extension include symmetric extension, cyclic extension and cyclic shift plus symmetric extension. Modulated data symbols arrive from the left, undergo serial-to-parallel, S/P, processing and are fed to a discrete Fourier transform, DFT, stage, to obtain what may be referred to as a first signal. Following the DFT, a symmetric frequency extension is performed, extending the first signal in both spectrum directions by an equally large extent. The spectrally extended first signal, to which a reference symbol sequence has also been mapped, may be referred to as a second signal. The second signal is then provided to a frequency-domain spectral shaping, FDSS, stage, where a shape of the signal is modified to optimize it for wireless transmission, for example to reduce the PAPR, and/or to increase its spectral flatness. The spectral effects of extension and shaping are schematically illustrated in FIG. 1 below the transmitter sequence. An inverse Fourier transform, iFFT, is performed, e.g. an inverse fast Fourier transform, to obtain a time-domain signal from the spectrally shaped signal, which is then, after the iFFT, converted to serial form in a parallel-to-serial, P/S, stage. A cyclic prefix, CP, may be added to obtain a transmit, Tx, signal as an output of the process of FIG. 1. Alternatively to CP, its functionality may be obtained using a Known Tail functionality, for example in sixth generation, 6G, systems. A cyclic prefix prefixes of a symbol, with a repetition of the end, for example, and may be used to provide a guard interval against inter-symbol interference and/or to cause that a linear convolution of a frequency-selective multipath channel can be modelled as circular convolution, which may transform to the frequency domain via a DFT.

The spectral shaping may be applied with or even without the spectral extension. In spectral shaping, the transmission band bins are weighted by an FDSS function before mapping to the iFFT-stage input. Parameters of the spectrum extension include an in-band size, indicating a number M of resource elements, REs, in the nominal frequency band, illustrated as the size following DFT and before the effect of extension. The frequency band may more generally be referred to as a frequency interval. M may alternatively be expressed in full resource blocks, RBs, which comprise plural REs. It may also be the case, that the extended signal will occupy full RBs even if the equation $(1+\text{alpha})\times M$ is not an integer multiple of the number of REs in a RB. Further, an excess band size is the extent of spectrum extension outside the frequency interval, $Q-M$ where Q is the size, in REs, of the entire spectrally extended signal, both inside and outside of the frequency interval. Q may thus also be considered to be the number of subcarriers in both the resource block(s) located inside the frequency interval and in the resource block(s) located outside the frequency interval. This may be referred to as the total allocation size. Alfa in FIG. 1 is the extension factor, $(Q-M)/Q$. In general, the shaping function without spectrum extension is a trade-off between demodulation performance and transmit power gain while shaping with spectrum extension is trade-off between spectral efficiency and transmit power gain.

In general, in cellular communication systems user equipment, UE, transmission power is a very valuable resource in uplink, UL, and enhancements to unlock additional UL transmit power are valuable. Enabling UEs to transmit at a higher power, for example for carrier aggregation, CA, and dual-carrier, DC, operation is thus of considerable interest. FDSS with spectrum extension might enable this, provided such a solution can be carried out successfully in terms of the overall system. A DFT-spread orthogonal frequency division multiplexing, DFT-s-OFDM, waveform is inherently of a lower PAPR than, for example, cyclic-prefix OFDM, CP-OFDM, wherefore DFT-s-OFDM might be used together with FDSS and spectrum extension to obtain a signal which may be transmitted at a higher transmit power level, resulting in an uplink coverage extension, a clear technical benefit.

To assist reception of a transmitted uplink signal, reference signals may be multiplexed with data symbols. The reference signals are of a known reference signal sequence, enabling the receiver to search for the known reference signal sequence in its task of finding and detecting the transmitted uplink signal. In general, at least reference signal sequences which have DFT samples of constant amplitude have the property that cyclically shifted versions of a reference signal sequence are orthogonal with one another. The transmitted uplink signal may be transmitted over a physical shared uplink channel, PUSCH, for example. Although disclosed herein primarily from the point of view of an uplink signal, the methods disclosed herein may be applicable to downlink signals as well, when FDSS with SE is applied. In the downlink case, it may be desirable to orthogonalize reference signal sequences between plural cells of the cellular communication system, for example. Whether in uplink or downlink, the reference signal sequence may be e.g. a demodulation reference signal, DMRS, sequence or a sounding reference signal, SRS, sequence, for example.

When a low-PAPR sequence is used to get a reference signal sequence of length M>=36 (for in-band allocation of 6 resource blocks, RBs, or more, for example) it may be generated, for example, based on a Zadoff-Chu, ZC, sequence of length N, where N is the largest prime number smaller than M. The obtained Zadoff-Chu sequence may then be cyclically extended to length M. By cyclically extending it is meant, in general, that last L elements of the sequence are prepended to the beginning, first end, of the sequence and/or first F elements of the sequence are appended to the end of the sequence, or the second end. The length of the sequence is increased by L+F. For example, the sequence is {A, B, C, D, E} and L=1, F=2, then the cyclically extended sequence is {E, A, B, C, D, E, A, B}. Cyclically extending may also be referred to as circularly extending. Cyclic shifting, also known as circular shifting, is the operation of rearranging the elements in a sequence, either by moving the final entry to the first position, while shifting all other entries to the next position, or by performing the inverse operation. These directions of cyclic shifting may be referred to as a left cyclic shift (the direction of the cyclic shift is to a decreasing index) and a right cyclic shift (the direction of the cyclic shift is to an increasing index), for example, a left cyclic shift by P positions or a right cyclic shift by P positions. For example, a left cyclic shift of the sequence {A, B, C, D, E, F} by 2 positions is {C, D, E, F, A, B}. A cyclic shift does not change the length of the sequence.

By resource element, RE, it is meant one subcarrier in frequency domain and one OFDM symbol in time domain. By resource block, RB, it is meant a set of resource elements consecutive in frequency domain, for example 12 consecutive resource elements of 12 consecutive subcarriers. A RB is thus one OFDM symbol long in the time domain. For example in NR, an RB comprises exactly twelve REs consecutive in the frequency domain. In general, while described herein primarily in terms of NR, the principles of the methods disclosed herein are applicable also to other OFDM radio access technologies. For example, 5G-Advanced (that is, NR of Release 18 and beyond) and 6G are examples of such other OFDM radio access technologies.

A comb structure may be used with reference signals, allowing for reference signal multiplexing between two code-division multiplex, CDM, groups for different antenna ports of a UE, in the RE mapping. In NR, DMRS occupies every second RE, such that the repetition factor is two. However, the methods disclosed herein are not limited to the case of repetition factor being two but may be applied to any repetition factor, including one (no IFDM). Additionally, orthogonal cover codes may be applied to allow for code-division multiplexing within code-division multiplex, CDM, groups. Orthogonal cover code, OCC, spreading may be performed both in frequency and time domain by length-2 OCC codes $w_f$ and $w_t$ respectively.

For FDSS with spectrum extension, it can be noted that reference signal sequences should have the same bandwidth as the data, to allow a base station to estimate the combined effect of UE FDSS filter and the radio channel, for advanced receivers utilizing also the data symbols on the frequency extended part of the band for uplink signal detection. Reference signal sequences may have a same, or lower, power amplifier, PA, output power back-off, OBO, as data symbols. A UE may select a reference signal sequence, for example, based on a number of in-band RBs or on a total number of allocated RBs, including also those in the spectrally extended frequency area.

Interference from another code-division multiplexed signal is controlled by averaging the received reference signal samples over the used OCC codes. In the new radio, NR, radio-access technology this means averaging over 2 adjacent reference signal subcarriers and/or 2 reference signals. This requires, in NR, that the channels from the multiplexed UEs do not significantly change during the averaging and that the product of interfering reference signal sequence element× conjugate(desired reference signal sequence element) does not change. When averaging over 2 adjacent reference signal sequence elements, this, and OCC orthogonality, is achieved only if both desired and interfering sequence elements are the same.

The total resources for uplink transmission with spectrum extension may be allocatable only with a certain granularity, for example a granularity of complete RBs. In practice, this results in a suboptimal overhead when an odd number of RBs are to be placed in the out-of-band region by spectrum extension, since frequency resources not used would still be allocated. In general it makes sense to support operation of excess band with an odd number of RBs, since rounding up to occupy an even number of RBs creates overhead of its own. An example is where a single RB is to be allocated in the out-of-band area. In symmetric frequency extension, the extended portion would cover a half of an RB in both sides of the nominal frequency band, or frequency interval, resulting in the other half of the RB on both sides being allocated, but unused. For example the NR radio-access technology does not even support resource allocation for fractional RBs.

Figure 2A:
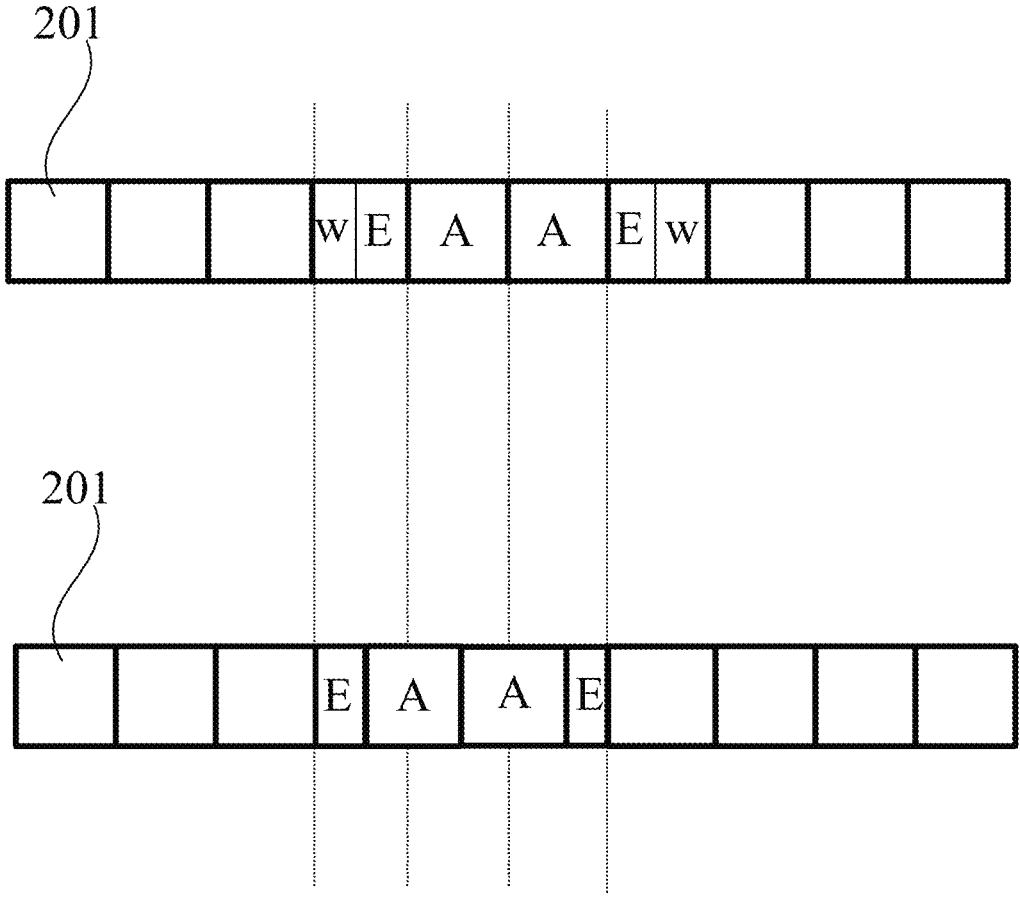
FIG. 2A, shows spectrum extension.

This is illustrated in FIG. 2A, showing spectrum extension. In the upper part, a sequence of RBs 201 is illustrated, wherein two full RBs "A" are in-band, and the signal is frequency extended by a total of one RB, amounting to a half RB on both sides of the frequency band, or frequency interval. The allocated half-RBs in excess band are denoted by E, whereas w denotes a wasted half-RB at either side of the allocated band. In the lower part, the waste is removed by frequency shifting the in-band allocation by a half-RB (in NR, this is six REs). Once the shifted in-band allocation is extended by half an RB at both ends, the overall allocation is aligned with the RB grid 201, resulting in no waste "w". The shift may be in either direction. In the NR radio-access technology, reference signal sequences are referred to as demodulation reference signal, DMRS, sequences. When the number of allocated RBs is small, the effect of waste "w" would be quite significant, wherefore the half-RB shifting produces a tangible benefit in terms of spectrum use efficiency. In general, a frequency shift is a change of the frequency of a signal or of a channel in an ascending or descending frequency direction.

A problem results, however, in that with such a half-RB shift, the reference signal sequence element on a given RE differs from the usual behaviour, employed by other UEs even when the in-band allocation reference number sequences are the same. This is so, since the subcarrier position of reference signal sequence elements is no longer aligned with legacy reference signal sequence elements used by other UEs. This has the unwanted and damaging effect, that orthogonality between the used OCC codes is lost, preventing reference signal sequence multiplexing for multi-user operation. When the orthogonality is impaired, interference between the UEs becomes more pronounced. When used, reference signal sequences may be multiplied by OCC codes.

Mechanisms provided herein maintain OCC and, hence, reference signal sequence orthogonality between legacy UEs and reference signal sequences on in-band RBs when FDSS with spectral extension, SE, is used together with half-RB shifting to reduce SE overhead. In NR, a half-RB is six REs.

The context of the herein described mechanisms is that a total frequency domain resource allocation comprises two portions: in-band RBs and spectral extension RBs. Spectral extension RBs are equally divided on both sides, the lower and the upper frequency side, of the in-band RBs. A signal on spectral extension RBs may be generated by replicating the transmit signal on the edges of in-band RBs prior to FDSS, for example. Another approach is to define a reference signal sequence based on total RBs, both in-band and excess band. Both in-band RBs and spectral extension RBs are allocated as multiples of complete, not fractional, RBs. When the number of spectral extension RBs is odd, mapping of an in-band data signal to RBs is shifted by one half of an RB (6 REs in NR) from the RB grid common among UEs either in the ascending or the descending frequency direction. To obtain spectral extension, an in-band data signal may be symmetrically and cyclically extended and mapped to the excess band REs, for example. In general, a transmit signal is a physical uplink shared data channel signal which may include uplink control information. In some embodiments a transmit signal is a physical downlink shared channel signal. In some embodiments a transmit signal includes a demodulation reference signal.

The mechanisms to alleviate the effect of the problem of lost orthogonality includes that a reference signal sequence, for example DMRS sequence, sequence identity is selected at least in part based on the number of allocated in-band RBs. For example, the sequence may be selected based on the sequence length, sequence group parameter and sequence number parameter. Selecting based on the number of allocated in-band RBs may comprise selecting a reference number sequence which is long enough to cover the allocated in-band RBs, for example.

The selected reference signal sequence is extended so that the original reference signal sequence elements are mapped to the same OFDM subcarriers within a RB, but not necessarily on the same RB, as without any spectral extension. The extension method is selected based on whether the number of excess band RBs is even or odd, or whether the in-band RB shift is applied on data symbols or not.

When the number of excess band RBs, generated by frequency extension, is even, a reference signal sequence is cyclically extended by a same amount both at the end and at the beginning of sequence, resulting in an extended reference signal sequence. In case of ZC based reference signal sequence, a modified cyclic extension may be, but need not be, used. Orthogonality is maintained, since reference signal sequences have the characteristic that their cyclic extensions are orthogonal with themselves.

When the number of excess band RBs, generated by frequency extension, is odd, either, as a first option, the original reference signal sequence is modified before sequence extension or, as a second option, the reference signal sequence spectral extension is modified.

In the first option, the reference signal sequence is modified before the spectral extension. The reference signal sequence elements are cyclically shifted by $N/(2m)$ elements (N is the number of subcarriers in a RB, which is 12 in NR, and m is the spacing between adjacent subcarriers that carry reference signals, this being 2 in NR), after which the reference signal sequence is cyclically extended by a same amount both at the end and at the beginning of sequence, resulting in extended reference signal sequence. The direction of the sequence cyclic shifting is determined either by a) the direction of the in-band RB shift or b) an indication received from a base station. In the case that the shift is in ascending frequency direction, the cyclic shift is to the direction of descending sequence element indexes, correspondingly. In the case of the shift is in descending frequency direction, the cyclic shift is to the direction of ascending sequence element indexes. In case of ZC based reference signal sequence, the cyclic shifting may be applied on the ZC sequence, followed by spectral extension. Such spectral extension may comprise, for example, reusing for the spectrum extension the same logic as used for extending the Zadoff-Chu sequences cyclically within the allocated spectrum. In other words, the ZC samples used in the spectrum extension would not be obtained by copying the content of some in-band PRB(s), but rather by using cyclic extension on both sides of the sequence, that is, the symmetric extension would be at RE level and not at PRB level.

In the second option, reference signal spectral extension is modified. The reference signal sequence is cyclically extended both at the end and at the beginning of sequence, resulting in extended reference signal sequence, in case more than one RB is extended by SE. If the overall extension is a single RB, then the reference signal sequence is cyclically extended at only one end. The sequence is, in detail, extended by $N/(2m)$ elements, corresponding to one RB, more (or less) at the beginning of the sequence than at the end of the sequence corresponding either a) to the direction of the in-band RB shift, whether the shift is in descending or ascending frequency direction, correspondingly, or b) to the indication received from base station. In other words, the sequence is extended $(Q-M+N)/(2m)$ sequence elements at the beginning (end) of sequence and $(Q-M-N)/(2m)$ sequence elements at the end (beginning) of the sequence when, e.g., the in-band RB shift is in descending frequency direction (ascending frequency direction), correspondingly.

In other words, in the first option a cyclically shifted version of the reference signal sequence is cyclically extended symmetrically, by a same length at both ends, while in the second option a non-shifted version of the reference signal sequence is cyclically extended asymmetrically, by one RB length more at one end than at the other end.

Whether extended using the first or the second option, the extended reference signal sequence is mapped on the sub-carriers on the total resource allocation, both in-band and excess band.

In some embodiments for the second option, when the reference signal sequence is an extended Zadoff-Chu sequence, the extended reference signal sequence may be obtained directly from the Zadoff-Chu sequence by cyclically extending the Zadoff-Chu sequence by $(Q-M+N)/(2m)$ sequence elements at the beginning of sequence and $(Q-M-N)/(2m)+(M/m-Nzc)$ sequence elements at the end of sequence when the in-band RB shift is in descending frequency direction (and cyclically extending it by $(Q-M-N)/(2m)$ sequence elements at the beginning of sequence and $(Q-M+N)/(2m)+(M/m-Nzc)$ sequence elements at the end of sequence when the in-band RB shift is in ascending frequency direction), where Q is number of subcarriers in the total allocation, M is the number of subcarriers in the in-band allocation, N (12 in NR) is the number of subcarriers in a RB, m (2 in NR) is the spacing between adjacent subcarriers carrying reference signals, and Nzc is the length of corresponding Zadoff-Chu sequence.

Figure 2B:
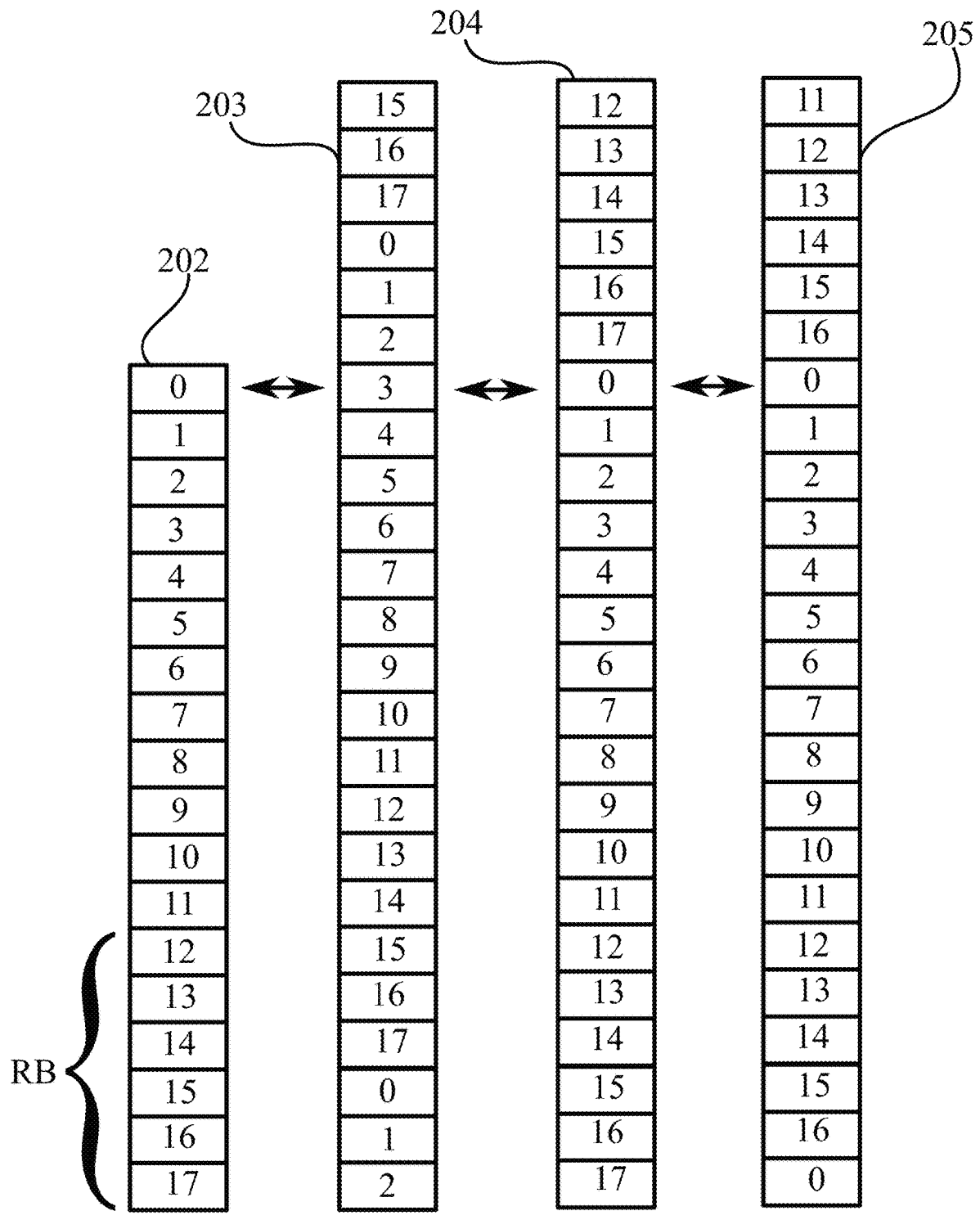
FIG. 2B illustrates reference signal sequence handling in accordance with at least some embodiments of the present invention.

FIG. 2B illustrates reference signal sequence handling in accordance with at least some embodiments of the present invention. On the left is an unmodified reference signal sequence 202, representing a reference signal sequence usable with three RBs, the length of one RB being indicated next to sequence 202 using a curved bracket.

Reference signal sequence 203 represents a half-RB shift to optimize resource use in spectrum extension, as illustrated in FIG. 2A. However, as a result, orthogonality of the sequence with the un-shifted sequence 202 is lost, as schematically illustrated in FIG. 2B as signal 3 being on a same frequency as signal 0 in the un-shifted sequence 202.

Reference signal sequence 204 has been extended in accordance with the second option describe above, by cyclically extending the sequence at the beginning by one RB, and by zero RBs at the end. This preserves orthogonality with the legacy sequence 202, as indicated schematically in FIG. 2B by the elements zero landing on the same frequency.

Reference signal sequence 205 corresponds to the Zadoff-Chu embodiments for the second option, described above. In sequence 205, the, signals 0, 1, 2 . . . 16 mark Zadoff-Chu sequence of length 17 that is used in the same frequency range as the legacy 3-RB reference signal sequence 0, 1, 2 . . . 17 shown in sequence 202 of the figure. The reference signal sequence is cyclically extended from the Zadoff-Chu sequence so that $\{0, 1, 2 \ldots 16, 17\} => \{0, 1, 2 \ldots 16, 0\}$. When the reference signal sequence is extended in a regular manner, there is an instance where signals 0 and 17 are mapped on adjacent reference signal REs. This means that Zadoff-Chu sequence element 0 is repeated on adjacent reference signal subcarriers, as both $0=>0$ and $17=>0$. In these embodiments, the extended reference signal sequence is obtained by cyclically extending the Zadoff-Chu sequence (not the in-band reference signal sequence) to avoid the repetition of sequence element 0 on adjacent subcarriers.

Further, it can be noted from FIG. 2B that the legacy 3-RB reference signal sequence can be code-division multiplexed with the extended reference signal sequence when the legacy UE allocation starts from RB 1, but not when the allocation starts from RB 0. In FIG. 2B, the reference signal sequence cyclic shifting or sequence extension modification depend on the direction of in-band shift. This limitation may be avoided where the reference signal sequence cyclic shifting or sequence extension modification depends on the indication from base station, for example in downlink control information, DCI, providing an uplink grant for the uplink transmission, such as for PUSCH. With that indication, the original reference signal sequence starts either from the start of RB1 or RB0. Hence, the base station is enabled to dynamically align the extended sequence so that the code-division multiplexed legacy reference signal sequence can start either from RB0 and RB1. In case the reference signal sequence is selected according to both in-band and excess band, then also the excess band is orthogonalized with legacy devices not operating as described herein.

The herein disclosed reference signal management methods provide the technical benefits, that a reference signal sequence may have its length based on in-band allocation size while allowing also for spectral extension overhead reduction when total excess band is odd number of RBs. Reference signal multiplexing with OCC with legacy UEs is facilitated. Additionally, reference signal based on in-band allocation reaches low PAPR values facilitating achieving low OBO with spectrally extended FDSS. The herein disclosed reference signal management methods may be used together with DFT-s-OFDM, FDSS and spectrum extension. The reference signal sequence, after its extension, may have the same bandwidth as the data to be transmitted. Further benefits of at least some embodiments include that a high number of orthogonal DMRS ports may be supported, for example in the case of MU-MIMO in massive MIMO, also in the scenarios involving FDSS with spectrum extension, and at least some embodiments enable uplink MU-MIMO between legacy UEs and UEs which use FDSS-SE in the uplink while minimizing the excess band of UEs which use FDSS-SE in the uplink.

Figure 3:
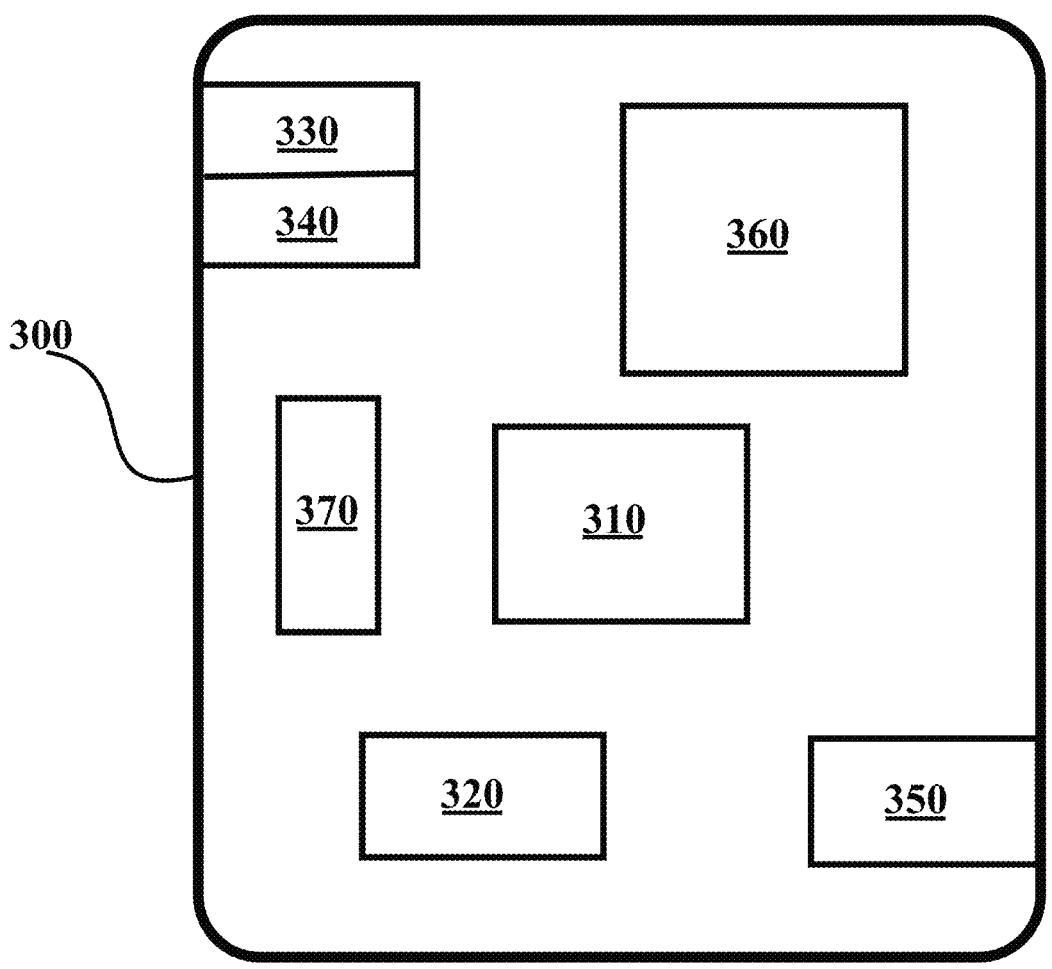
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a user equipment, UE, or, in applicable parts, a base station. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. When processor 310 comprises more than one processor, device 300 may be a distributed device wherein processing of tasks takes place in more than one physical unit. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as selecting, determining, extending, mapping, performing, shaping, causing transmitting and shifting. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or base station, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Memory 320 may be non-transitory. The term "non-transitory", as used herein, is a limitation of the medium itself (that is, tangible, not a signal) as opposed to a limitation on data storage persistency (for example, RAM vs. ROM).

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

FIG. 4 illustrates an example process in accordance with at least some embodiments of the present invention. The process may be performed in a user equipment, for example. Examples of user equipments include smartphones, feature phones, Internet of Things IoT, nodes and, for example, connected car connectivity modules. The process of FIG. 4 takes place in a New Radio system, wherein the reference signal sequences are DMRS sequences.

In phase 410, a DMRS sequence is selected based at least in part on the number of RBs in-band, that is, in the nominal frequency band to be used. In phase 420, the number of RBs to be placed in spectrally extended parts of the spectral extent of the transmitted uplink signal is determined, and in phase 430 it is determined, if the number of RBs determined in phase 420 is even or odd. In phase 440, the DMRS sequence is extended with a method which is selected based on whether the number of RBs determined in phase 420 is even or odd, and finally, phase 450, the extended DMRS sequence is mapped such that it covers in-band and excess band REs. Further, in this phase FDSS is performed, and a signal for transmission in the uplink is generated.

Figure 5:
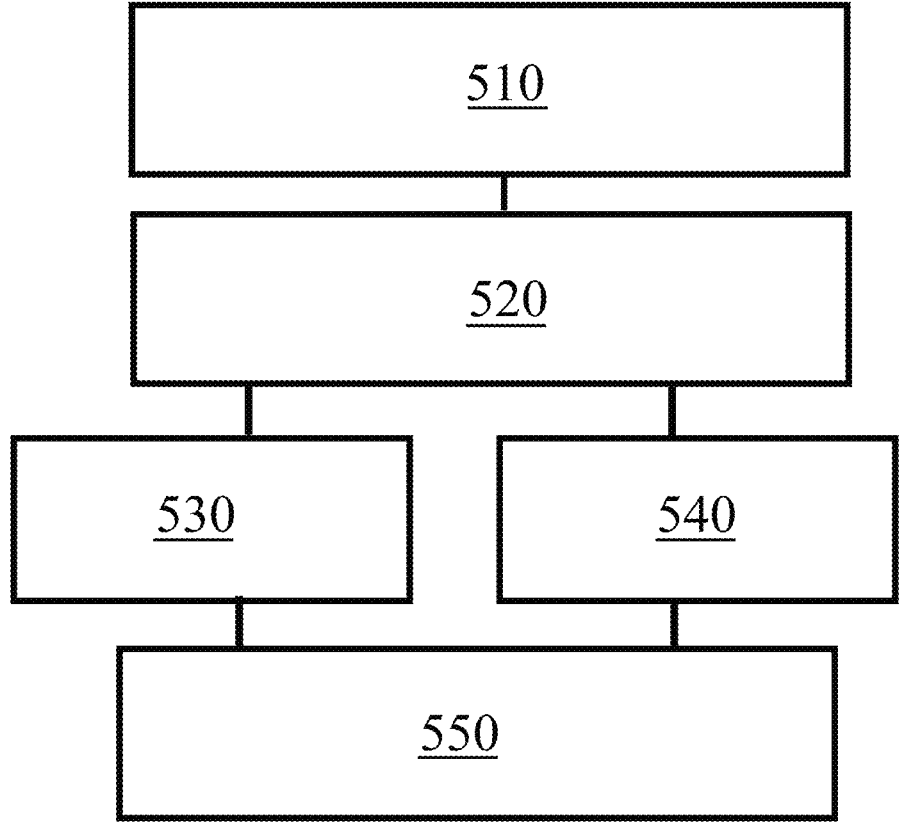
FIG. 5 is a flow graph of a method in accordance with at least some embodiments of the present invention.

FIG. 5 is a flow graph of a method in accordance with at least some embodiments of the present invention. The phases of the illustrated method may be performed in device 110, an auxiliary device or a personal computer, for example, or in a control device configured to control the functioning thereof, when installed therein.

Phase 510 comprises selecting a reference signal sequence for a first signal based on a first number of resource blocks located in a frequency interval. Phase 520 comprises determining a second number of resource blocks located outside the frequency interval via spectrally extending the first signal, determining whether the second number is an odd number, and based on determining that the second number is an odd number, apply a frequency shift to the first signal and extend the selected reference signal sequence by performing exactly one of phases 530 and 540. Phase 530 comprises applying a cyclic shift to the selected reference signal sequence and then applying a cyclic extension to the selected reference signal sequence at both ends of the selected reference signal sequence. Phase 540 comprises applying a cyclic extension to the selected reference signal sequence, wherein the cyclic extension is by a third number of sequence elements at a first end of the sequence and by a fourth number of sequence elements at a second end of the sequence, wherein the third number of sequence elements is greater than the fourth number of sequence elements. Phase 550 comprises mapping the extended reference signal sequence to the resource blocks located in the frequency interval and the resource blocks located outside the frequency interval, performing spectral shaping of a second signal comprising the resource blocks located both inside and outside the frequency interval, and transmitting the second signal in uplink direction.

The shifting may correspond to half a resource block in length. The extended reference signal sequence may correspond in length to the number of resource blocks to be used in a frequency band plus the number of resource blocks to be employed outside the frequency band via spectrally extending the transmit signal. Phase 540 may be performed without applying a cyclic shift to the selected reference signal sequence. In some embodiments, phase 530 is not performed and the selected reference signal sequence is always extended using phase 540. In some embodiments, phase 540 is not performed and the selected reference signal sequence is always extended using phase 530. A first end of the sequence may be the first element of the sequence and a second end of the sequence the last element of the sequence. Alternatively, a first end of the sequence is the last element of the sequence and a second end of the sequence is the first element of the sequence. In some embodiments, the spectral shaping is absent.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless communication.

| ACRONYMS LIST | |
| --- | --- |
| 3GPP | $3^{rd}$ generation partnership project |
| CAZAC | constant amplitude zero autocorrelation |
| CDM | code division multiplexing |
| DFT | discrete Fourier transform |
| FDSS | frequency domain spectral shaping |
| iFFT | inverse fast Fourier transform |
| MIMO | multiple input multiple output |
| MU-MIMO | multi-user MIMO |
| NR | new radio |
| OBO | output power back-off |
| OCC | orthogonal cover code |
| PA | power amplifier |
| PAPR | peak to average power ratio |
| RB | resource block |
| RE | resource element |
| SE | spectral extension |
| UE | user equipment |

The invention claimed is:

1. An apparatus comprising at least one processing core and at least one memory storing instructions that, when executed by the at least one processing core, cause the apparatus at least to:

select a reference signal sequence for a first signal based on a first number of resource blocks located inside a frequency interval;

determine a second number of resource blocks located outside the frequency interval via spectrally extending the first signal, determine whether the second number is an odd number, and based on determining that the second number is an odd number, apply a frequency shift to the first signal and extend the selected reference signal sequence by performing one of the following:

applying a cyclic shift to the selected reference signal sequence and then applying a cyclic extension to the selected reference signal sequence at both ends of the selected reference signal sequence, or applying a cyclic extension to the selected reference signal sequence, wherein the cyclic extension is by a third number of sequence elements at a first end of the selected reference signal sequence and by a fourth number of sequence elements at a second end of the selected reference signal sequence, wherein the third number of sequence elements is greater than the fourth number of sequence elements, and map the extended reference signal sequence to the resource blocks located in the frequency interval and the resource blocks located outside the frequency interval, perform spectral shaping of a second signal comprising the resource blocks located both inside and outside the frequency interval, and transmit the second signal in uplink direction.

2. The apparatus according to claim 1, wherein the reference signal sequence has the property that cyclically shifted versions of the reference signal sequence are orthogonal with one another.

3. The apparatus according to claim 2, wherein the selected reference signal sequence is a Zadoff-Chu sequence, a constant amplitude zero autocorrelation sequence or a computer search based zero autocorrelation sequence.

4. The apparatus according to claim 1, wherein the at least one memory storing instructions that, when executed by the at least one processing core, cause the apparatus to, only in case the second number is an even number, cyclically extend the selected reference signal sequence at both ends with a same number of elements without cyclically shifting the selected reference signal sequence.

5. The apparatus according to claim 1, wherein the at least one memory storing instructions that, when executed by the at least one processing core, cause the apparatus to perform the cyclic shift of the selected reference signal sequence by shifting it by $N/(2 \times m)$ positions, where N is a number of subcarriers in a resource block and m is spacing between adjacent subcarriers that carry the reference signal sequence, wherein the spacing is an integer number of subcarriers.

6. The apparatus according to claim 5, wherein the at least one memory storing instructions that, when executed by the at least one processing core, cause the apparatus to select a direction for the cyclic shift based on an instruction from a base station node, or based on a direction of the frequency shift, wherein the direction of the cyclic shift is to a decreasing index based on the frequency shift being in an ascending frequency direction or the direction of the cyclic shift is to an increasing index based on the frequency shift being in a descending frequency direction.

7. The apparatus according to claim 1, wherein the at least one memory storing instructions that, when executed by the at least one processing core, cause the apparatus to, when the cyclic extension of the selected reference signal sequence at the first end is by the third number of sequence elements and by the fourth number of sequence element at the second end, cyclically extend the selected reference signal sequence at a first end by $(Q-M+N)/(2 \times m)$ sequence elements and by $(Q-M-N)/(2 \times m)$ sequence elements at the second end, where Q is a number of subcarriers of the resource blocks located both inside and outside the frequency interval, M is the number of the subcarriers in the frequency interval, N is a number of subcarriers in a resource block and m is the spacing between adjacent subcarriers that carry the reference signal sequence, wherein the spacing is an integer number of subcarriers.

8. The apparatus according to claim 1, wherein the at least one memory storing instructions that, when executed by the at least one processing core, cause the apparatus to, when the cyclic extension of the selected reference signal sequence at the first end is by the third number of sequence elements and by the fourth number of sequence element at the second end, obtain the extended reference signal sequence from the selected reference signal sequence by a cyclic extension of the selected reference signal sequence by $(Q-M+N)/(2 \times m)$ elements at the beginning of the sequence and by $(Q-M-N)/(2 \times m)+(M/m-Nzc)$ elements at the end of the sequence when the frequency shift is in a descending frequency direction, where Q is a number of subcarriers in an entire used allocation, M is a number of the subcarriers in the frequency interval, N is a number of subcarriers in a resource block, Nzc is a length of the selected reference signal sequence, and m is the spacing between adjacent subcarriers that carry the selected reference signal sequence, wherein the spacing is an integer number of subcarriers, wherein the selected reference signal sequence is a Zadoff-Chu sequence.

9. The apparatus according to claim 1, wherein the at least one memory storing instructions that, when executed by the at least one processing core, cause the apparatus to apply the cyclic shift to a Zadoff-Chu sequence as the selected reference signal sequence, and to apply a cyclic extension to the Zadoff-Chu sequence, wherein the cyclic extension is by a fifth number of sequence elements at a first end of the Zadoff-Chu sequence and by a sixth number of sequence elements at a second end of the Zadoff-Chu sequence, where the fifth number of elements equals to $(Q-M)/(2 \times m)$ and the sixth number of elements equals to $(Q-M)/(2 \times m)+(M/m-Nzc)$, where Nzc is the length of the Zadoff-Chu sequence, Q is a number of subcarriers in an entire used allocation, M is the number of the subcarriers in the frequency interval and m is the spacing between adjacent subcarriers that carry the selected reference signal sequence, wherein the spacing is an integer number of subcarriers.

10. The apparatus according to claim 1, wherein the at least one memory storing instructions that, when executed by the at least one processing core, cause the apparatus to at least one of: spectrally extend the transmit signal symmetrically on both sides of the frequency interval, or apply, in case the cyclic shift is applied, the cyclic extension to the selected reference signal sequence at both ends of the selected reference signal sequence by a same number of elements.

11. A method comprising:
selecting a reference signal sequence for a first signal based on a first number of resource blocks located in a frequency interval;
determining a second number of resource blocks located outside the frequency interval via spectrally extending the first signal, determining whether the second number is an odd number, and based on determining that the second number is an odd number, applying a frequency shift to the first signal and extending the selected reference signal sequence by performing one of the following:
applying a cyclic shift to the selected reference signal sequence and then applying a cyclic extension to the selected reference signal sequence at both ends of the selected reference signal sequence, or
applying a cyclic extension to the selected reference signal sequence, wherein the cyclic extension is by a third number of sequence elements at a first end of the sequence and by a fourth number of sequence elements at a second end of the sequence, wherein the third number of sequence elements is greater than the fourth number of sequence elements, and
mapping the extended reference signal sequence to the resource blocks located in the frequency interval and the resource blocks located outside the frequency interval, performing spectral shaping of a second signal comprising the resource blocks located both inside and outside the frequency interval, and transmitting the second signal in uplink direction.

12. The method according to claim 11, wherein the reference signal sequence has the property that cyclically shifted versions of the reference signal sequence are orthogonal with one another.

13. The method according to claim 12, wherein the selected reference signal sequence is a Zadoff-Chu sequence, a constant amplitude zero autocorrelation sequence or a computer search based zero autocorrelation sequence.

14. The method according to claim 11, further comprising: in case the second number is an even number, cyclically extending the selected reference signal sequence at both ends with a same number of elements without cyclically shifting the selected reference signal sequence.

15. The method according to claim 11, further comprising: performing the cyclic shift of the selected reference signal sequence by shifting it by $N/(2 \times m)$ positions, where N is a number of subcarriers in a resource block and m is spacing between adjacent subcarriers that carry the reference signal sequence, wherein the spacing is an integer number of subcarriers.

16. The method according to claim 15, further comprising: selecting a direction for the cyclic shift based on an instruction from a base station node, or based on a direction of the frequency shift, wherein the direction of the cyclic shift is to a decreasing index based on the frequency shift being in an ascending frequency direction or the direction of the cyclic shift is to an increasing index based on the frequency shift being in a descending frequency direction.

17. The method according to claim 11, further comprising: when the cyclic extension of the selected reference signal sequence at the first end is by the third number of sequence elements and by the fourth number of sequence element at the second end, cyclically extending the selected reference signal sequence at a first end by $(Q-M+N)/(2 \times m)$ sequence elements and by $(Q-M-N)/(2 \times m)$ sequence elements at the second end, where Q is a number of subcarriers of the resource blocks located both inside and outside the frequency interval, M is the number of the subcarriers in the frequency interval, N is a number of subcarriers in a resource block and m is the spacing between adjacent subcarriers that carry the reference signal sequence, wherein the spacing is an integer number of subcarriers.

18. The method according to claim 11, further comprising: when the cyclic extension of the selected reference signal sequence at the first end is by the third number of sequence elements and by the fourth number of sequence element at the second end, obtaining the extended reference signal sequence from the selected reference signal sequence by a cyclic extension of the selected reference signal sequence by $(Q-M+N)/(2 \times m)$ elements at the beginning of the sequence and by $(Q-M-N)/(2 \times m)+(M/m-Nzc)$ elements at the end of the sequence when the frequency shift is in a descending frequency direction, where Q is a number of subcarriers in an entire used allocation, M is a number of the subcarriers in the frequency interval, N is a number of subcarriers in a resource block, Nzc is a length of the selected reference signal sequence, and m is the spacing between adjacent subcarriers that carry the selected reference signal sequence, wherein the spacing is an integer number of subcarriers, wherein the selected reference signal sequence is a Zadoff-Chu sequence.

19. An apparatus comprising at least one processing core and at least one memory storing instructions that, when executed by the at least one processing core, cause the apparatus at least to:
select a reference signal sequence based on a first number of resource blocks located inside a frequency interval in an uplink transmission received by the apparatus;
determine a second number of resource blocks located outside the frequency interval via spectrally extending the uplink transmission, determine whether the second number is an odd number, and based on determining that the second number is an odd number, apply a frequency shift to the uplink transmission received by the apparatus and extend the selected reference signal sequence by performing one of the following:

applying a cyclic shift to the selected reference signal sequence and then applying a cyclic extension to the selected reference signal sequence at both ends of the selected reference signal sequence, or applying a cyclic extension to the selected reference signal sequence, wherein the cyclic extension is by a third number of sequence elements at a first end of the sequence and by a fourth number of sequence elements at a second end of the sequence, wherein the third number of sequence elements is greater than the fourth number of sequence elements, and employ the extended reference signal sequence in reception of the uplink transmission in the apparatus.

20. The apparatus according to claim 19, wherein the at least one memory storing instructions that, when executed by the at least one processing core, cause the apparatus to perform the cyclic shift of the selected reference signal sequence by shifting it by $N/(2 \times m)$ elements, where N is a number of subcarriers in a resource block and m is spacing between adjacent subcarriers that carry the reference signal sequence, wherein the spacing is an integer number of subcarriers.

\* \* \* \* \*